(12) United States Patent  
Khizroev et al.

(10) Patent No.: US 6,865,056 B1  
(45) Date of Patent: Mar. 8, 2005

(54) LONGITUDINAL MAGNETIC RECORDING HEADS WITH VARIABLE-LENGTH GAPS

(75) Inventors: Sakhrat Khizroev, Pittsburgh, PA (US); Dmitri Litvinov, Pittsburgh, PA (US); Mark Howard Kryder, Pittsburgh, PA (US); James A. Bain, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 182 days.

(21) Appl. No.: 10/031,320

(22) PCT Filed: Oct. 4, 2000

(86) PCT No.: PCT/US00/27356  
§ 371 (c)(1),  
(2), (4) Date: Jan. 17, 2002

(87) PCT Pub. No.: WO01/26097  
PCT Pub. Date: Apr. 12, 2001

Related U.S. Application Data

(60) Provisional application No. 60/157,883, filed on Oct. 5, 1999.

(51) Int. Cl.$^7$ ................................................ G11B 5/31
(52) U.S. Cl. ..................................................... 360/119
(58) Field of Search .................................. 360/119, 125

(56) References Cited

U.S. PATENT DOCUMENTS

| | | | |
|---|---|---|---|
| 2,822,427 A | | 2/1958 | Atkinson et al. |
| 3,201,731 A | | 8/1965 | Baenziger et al. |
| 3,314,056 A | | 4/1967 | Lawrance |
| 3,569,984 A | * | 3/1971 | Watson ...................... 360/119 |
| 3,582,918 A | | 6/1971 | Tiemann |
| 3,621,153 A | | 11/1971 | Wenner |
| 3,686,467 A | | 8/1972 | Camras |
| 3,686,468 A | | 8/1972 | Garnier, Jr. |
| 3,694,784 A | | 9/1972 | Meili |
| 4,188,649 A | | 2/1980 | Cheatham et al. |
| 4,386,383 A | * | 5/1983 | Desserre et al. ............. 360/126 |

(List continued on next page.)

FOREIGN PATENT DOCUMENTS

| | | | |
|---|---|---|---|
| GB | 948648 | | 4/1961 |
| GB | 1251372 | | 10/1971 |
| GB | 1344890 | | 1/1974 |
| JP | 57198523 | | 12/1982 |
| JP | 58121124 | | 7/1983 |
| JP | 63016407 | | 1/1988 |
| JP | 2-14413 | * | 1/1990 |
| JP | 3-178014 | * | 8/1991 |
| JP | 4-13209 | * | 1/1992 |
| JP | 4-248105 | * | 9/1992 |
| JP | 6-4829 | * | 1/1994 |
| WO | WO01/26097 | | 4/2001 |

OTHER PUBLICATIONS

Khizroev et al., U.S. Utility Appl. No. 09/755,730, Entitled "Gapless Longitudinal Magnetic Recording Head with Flux Cavity", filed Jan. 5, 2001.  
Batra, U.S. Utility Appl. No. 09/777,033, Entitled Longitudinal Magnetic Recording Head with Reduced Side Fringing, filed Feb. 5, 2001.  
IBM Technical Disclosure Bulletin, "Gapless Read Head Structure," Jan. 1971, vol. No. 13, Issue No. 8, p. 2374.

*Primary Examiner*—David L. Ometz  
(74) *Attorney, Agent, or Firm*—Alan G. Towner, Esq.; Pietragallo, Bosick & Gordon (57) ABSTRACT

A longitudinal recording head (50, 56, 60) for use with magnetic recording media includes a non-uniform gap (54, 59, 64) between first (51, 57, 61) and second magnetic (52, 58, 62) poles which focuses magnetic flux onto a small area of the magnetic recording medium. The non-uniform gap is preferably in the form of a cavity that is contoured to produce the desired flux pattern. Longitudinal recording heads incorporating the non-uniform gap are capable of improved recording densities.

20 Claims, 7 Drawing Sheets

U.S. PATENT DOCUMENTS

| | | |
|---|---|---|
| 4,422,118 A | 12/1983 | Helle et al. |
| 5,016,342 A | 5/1991 | Pisharody et al. |
| 5,027,244 A * | 6/1991 | Hayakawa .................. 360/119 |
| 5,063,467 A | 11/1991 | Colineau et al. |
| 5,434,733 A | 7/1995 | Hesterman et al. |
| 5,621,595 A | 4/1997 | Cohen |
| 5,734,533 A * | 3/1998 | Nepela ........................ 360/119 |
| 6,016,242 A * | 1/2000 | Mastain et al. ............. 360/119 |
| 6,043,960 A * | 3/2000 | Chang et al. ............... 360/317 |

* cited by examiner

LONGITUDINAL MAGNETIC RECORDING HEADS WITH VARIABLE-LENGTH GAPS

CROSS-REFERENCE TO RELATED APPLICATION

This application is a 371 of PCT/US00/27356 filed Oct. 4, 2000, which claims the benefit of United States Provisional Patent Application Ser. No. 60/157,883, filed Oct. 5, 1999.

FIELD OF THE INVENTION

This invention relates to magnetic recording heads, and more particularly, relates to thin-film longitudinal recording heads for recording at high densities.

BACKGROUND INFORMATION

Magnetic hard disk drives incorporating longitudinal recording heads are well known. However, conventional longitudinal recording heads suffer from the disadvantage that at high recording densities, e.g., exceeding 40 Gbit/in$^2$, the track width is relatively large. In particular, a track width cannot be defined which is smaller than the head track width plus two times the gap length of the head. This limitation results from side fringing magnetic fields which spread at a distance on the order of the gap length from the both track sides across the track. Decreasing the gap length should reduce this characteristic side fringing region. However, as the gap length is decreased, the magnetic fields in the region of recording media along the track are also reduced. For example, at a 50 nm gap length, the maximum in-plane field component at a 10 nm flying height is less than 10,000 Oe, assuming a high moment (4πM$_s$~20 kG) pole tip material is used. This field is not sufficient to record transitions clear enough for such high densities. At such high densities recording media are expected to have dynamic coercivity above 5,000 Oe, and approximately two times the coercivity is required to record sufficiently defined transitions. Therefore, there is a trade-off in decreasing the gap length.

The trade-off optimization indicates that the smallest gap length at which the maximum areal density can be achieved using a conventional longitudinal recording head ring structure is approximately 50 nm. Therefore, the smallest track width that can be achieved is approximately 50 nm+2×50 nm=150 nm. Taking into account 20 percent for the track misregistration, the smallest track pitch is approximately 180 nm. Assuming a 2:1 bit cell, the maximum areal density that can be achieved is approximately 40 Gbit/in$^2$.

U.S. Pat. No. 5,621,595 to Cohen discloses a magnetic recording head with a pinched gap which is said to reduce side fringing magnetic fields in the gap region. While the disclosed pinched gap design may reduce side fringing fields, the fields in the track region are also reduced significantly, resulting in the inability to record on high coercivity media. Furthermore, the pinched gap design is extremely sensitive to write currents.

The present invention has been developed in view of the foregoing, and to address other deficiencies of the prior art.

SUMMARY OF THE INVENTION

The present invention provides a non-uniform or contoured gap between first and second poles of a longitudinal recording head. The gap allows the magnetic field strength and profile to be controlled in a manner which concentrates the magnetic flux in the gap region. Strong localized magnetic fields are thereby generated in the magnetic recording region under the gap. The use of the present non-uniform gap significantly increases the data storage densities while avoiding the necessity of making substantial modifications to conventional longitudinal recording head designs.

An aspect of the present invention is to provide a longitudinal recording head for use with a magnetic recording medium, the longitudinal recording head comprising first and second poles, and a non-uniform gap defined by the first and second poles.

Another aspect of the present invention is to provide a method of making a gap between first and second poles of a longitudinal recording head for use with a magnetic recording medium. The method includes the steps of providing first and second adjacent poles, and creating a cavity between the first and second poles.

A further aspect of the present invention is to provide a method of storing data on a magnetic storage medium. The method includes the steps of providing magnetically permeable first and second poles defining a gap therebetween, providing a magnetic storage medium adjacent the first and second poles, and concentrating magnetic flux between the first and second poles in the vicinity of the gap to produce a localized magnetic field in the magnetic storage medium.

These and other aspects of the present invention will be more apparent from the following description.

DETAILED DESCRIPTION

Figure 1:
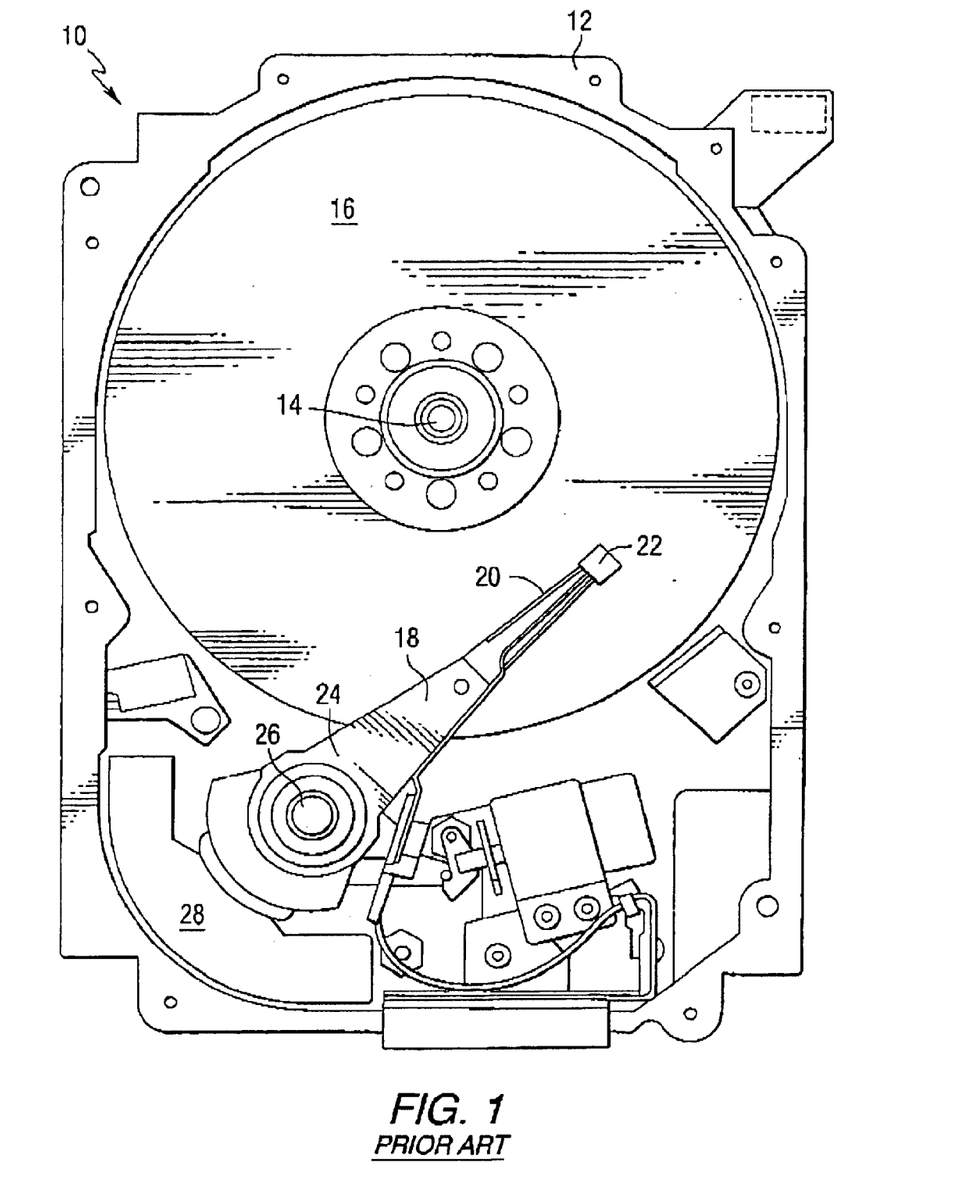
FIG. 1 is a top view of a typical computer hard disk drive for which the present invention may be used, illustrating the disk drive with its upper housing portion removed.

The invention is described in relation to presently known longitudinal recording heads used with a hard disk drive 10 for computers, one of which is illustrated in FIG. 1. As used herein, "recording head" means a head adapted for read and/or write operations. The hard disk drive 10 includes a housing 12 (with the upper portion removed and the lower portion visible in this view for maximum clarity) dimensioned and configured to contain and locate the various components of the disk drive 10. The disk drive 10 includes a spindle motor 14 for rotating at least one magnetic storage medium 16 within the housing, in this case a magnetic disk. At least one arm 18 is contained within the housing 12, with each arm 18 having a first end 20 with a longitudinal recording head 22, and a second end 24 pivotally mounted to a bearing 26. An actuator motor 28, such as a movable coil DC motor, is located at the arm's second end 24, pivoting the arm 18 to position the head 22 over a desired sector of the disk 16. The actuator motor 28 is regulated by a controller which is not shown, and which is well known.

Writing is accomplished by rotating the disk 16 relative to recording head 22 so that the recording head 22 is located above the appropriate sectors of tracks on the disk 16. Reading from the disk 16 may be accomplished either using the same head 22, or with a separate read head adjacent to the write head 22. If the individual magnetic fields are too close to each other within the magnetic layer of the disk 16, writing to the magnetic storage medium will affect not only the desired location on the disk, but also neighboring locations.

Therefore, maximizing flux density within a desired section of a track while minimizing flux density within neighboring sections, permits the tracks to be smaller, thereby permitting a greater number of tracks within a disk, and allowing the disk to store additional information. Additionally, concentrating the flux density within only the track directly below the recording head 22 will permit the same flux density within the track to be achieved by a lower power level. Alternatively, concentrating the magnetic flux will increase flux density at the same power level, thereby permitting a track to be magnetically harder (have a higher coercivity) at the same power level.

Figure 2:
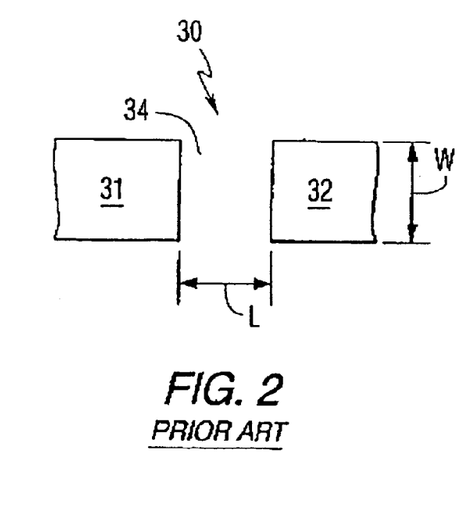
FIG. 2 is a partially schematic bottom view of a conventional longitudinal recording head having a uniform gap.
Figure 3:
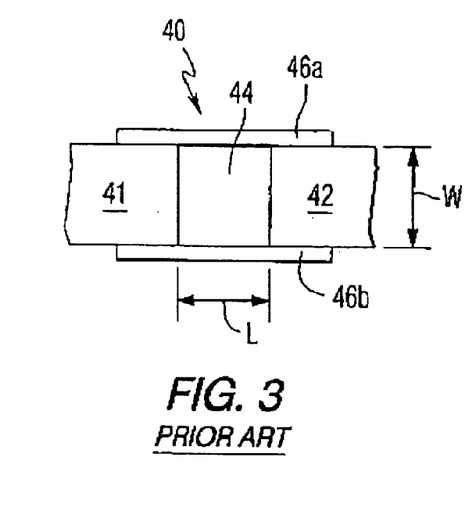
FIG. 3 is a partially schematic bottom view of a conventional longitudinal recording head having a uniform gap with side shields.

A conventional longitudinal recording ring head 30 having first and second poles 31 and 32 defining a uniform gap 34 is shown in FIG. 2. The gap 34 has a uniform length L across the track width W. One suggested approach for reducing side fringing fields generated by the conventional head 30 of FIG. 2 is to create side shields in the gap region, as shown in FIG. 3. The head 40 of FIG. 3 includes first and second poles 41 and 42 which define a gap 44 that has a uniform length L across the track width W. Side shields 46a and 46b are provided across the gap 44. With the side shields 46a and 46b, the magnetic flux tends to flow through the shielded regions, thereby reducing the side fringing fields.

Figure 5:
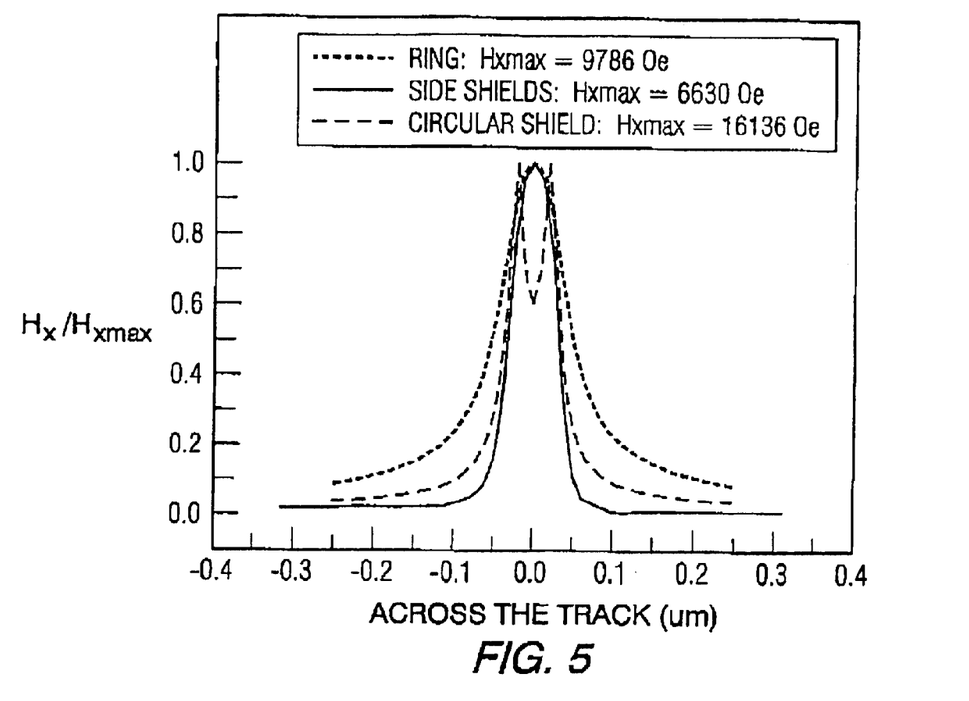
FIG. 5 is a graph of magnetic field strength across the track width for conventional uniform-gap recording heads and a non-uniform gap recording head in accordance with an embodiment of the present invention.

In-plane fields, calculated using a 3D boundary element field solver, Amperes, for the regular and the shielded heads shown in FIGS. 2 and 3 at the saturation point are shown in FIG. 5. It can be seen that although the side fringing fields are reduced in the head of FIG. 3, the fields in the track region are also reduced significantly, preventing recording on high coercivity media. The cause of this significant reduction is the existence of a path for the flux flow in the gap region.

A disadvantage of the pinched gap or side shield design shown in FIG. 3 is that the pinched gap has an abrupt or discontinuous reduction to zero of the gap length at the sides. As a result, heads of this type are known to have problems of extreme sensitivity to write currents. As soon as the write current reaches the saturation value, the sides of the pinched gap magnetically saturate. As a result of saturation, the sides become magnetically hard, which in turn means that the pinched gap turns into a regular gap effectively without any magnetically soft sides. Therefore, to take advantage of the pinched gap head, it is necessary to keep the write current exactly at a value just before saturation takes place, which puts very stringent requirements on the write current control. Another drawback of the pinched gap design is due to the fact that a significant flux amount flows throught the soft sides before saturation. The magnetic flux emanating from the gap region is therefore relatively small, resulting in relatively small recording fields. This becomes a critical problem for recording at high densities.

The use of a non-uniform gap in accordance with the present invention resolves these critical problems because the gap non-uniformity is relatively continuous across the gap. A preferred configuration provides a gap having a varying length dimension across the track. Such continuous reduction in the thickness provided by a non-uniform gap, unlike the abrupt shield reduction in the square shield configuration shown in FIG. 3, allows magnetic flux to concentrate in the region under the gap. As used herein, the term "non-uniform gap" includes gap configurations for which the gap length is not constant either along the dimension across the track or along the dimension perpendicular to the bottom or air bearing surface.

With the present non-uniform gap design, after the sides saturate, the magnetic charges on the inner sides of the gap effectively focus the recording field in the region under the gap. The shape of the gap controls the focusing effect. As a result, there is no sensitivity to the saturation current. Before the saturation occurs, the field increases due to the flux concentration in the gap region due to an easy flux propagation through the non-uniform gap sides. After the sides saturate, the field is enhanced in the gap region due to the focusing effect by the effective magnetic charges formed on the inner sides of the gap during the saturation process.

Figure 4:
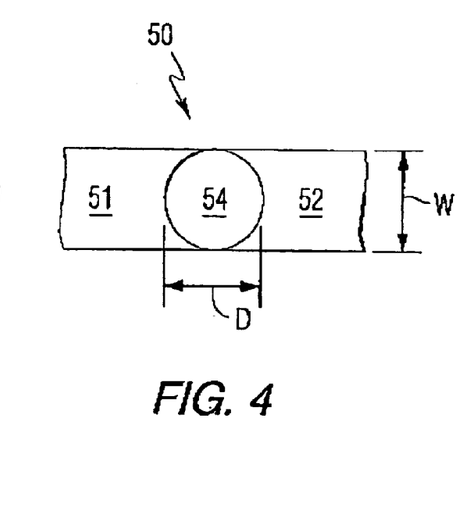
FIG. 4 is a partially schematic bottom view of a longitudinal recording head including a non-uniform gap in the form of a cavity in accordance with an embodiment of the present invention.

FIG. 4 illustrates a longitudinal recording head 50 having a non-uniform gap in accordance with an embodiment of the present invention. The head 50 includes first and second poles 51 and 52 which are made of magnetically permeable materials such as NiFe, FeAlN, FeTaN, CoFe, CoFeE or CoFeN. A generally cylindrical or hemispherical cavity 54 is provided between the first and second poles 51 and 52. The dimension D of the cavity 54 varies across the track width W. The cavity 54 thus defines a non-uniform gap between the first and second poles 51 and 52. The magnetic field from the head 50 is not only concentrated in the region defined by the head track width W, but is also stronger in magnitude than the field emanating from an equivalent conventional ring head. When saturated, the non-uniform gap head 50 shown in FIG. 4 is capable of generating very strong in-plane fields, e.g., stronger than 16,000 Oe, as shown in FIG. 5. Also, from FIG. 5 it can be seen that a head 50 as shown in FIG. 4 with a 50 nm diameter is capable of defining a track width of the order of 80 nm (significantly smaller than a 150 nm track width defined by the equivalent conventional ring head described above), which is suitable for very high recording densities, e.g., greater than 100 Gbit/in$^2$ areal density.

Figure 6A:
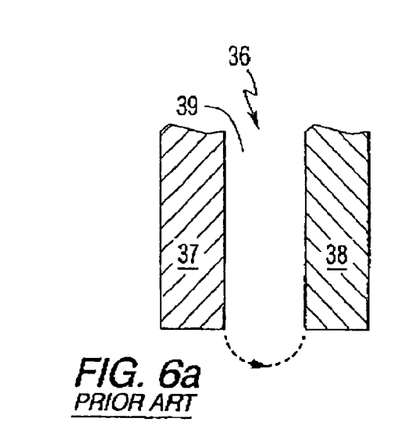
FIGS. 6a and 6b are partially schematic side and bottom views, respectively, of a conventional longitudinal recording head having a uniform gap.
Figure 6B:
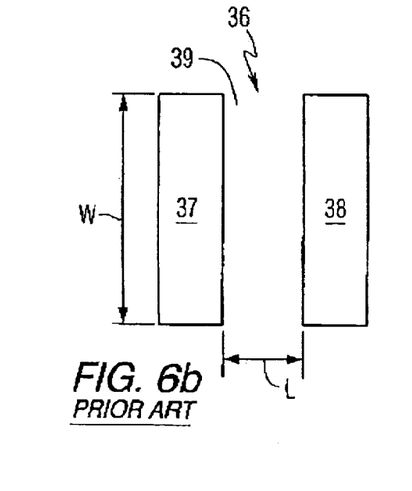

In accordance with a preferred embodiment of the present invention, desirable field profile and strength are created by varying the gap geometry in the vertical direction of the ring (perpendicular to the bottom or air bearing surface) as well as the horizontal direction. It should be noted that in conventional designs the gap geometry in the vertical direction remains constant from the level of the bottom or air bearing surface to the level of the throat height, as illustrated by the conventional head 36 of FIGS. 6a and 6b. As shown in FIGS. 6a and 6b, the first and second poles 37 and 38 define a uniform gap 39.

Figure 7A:
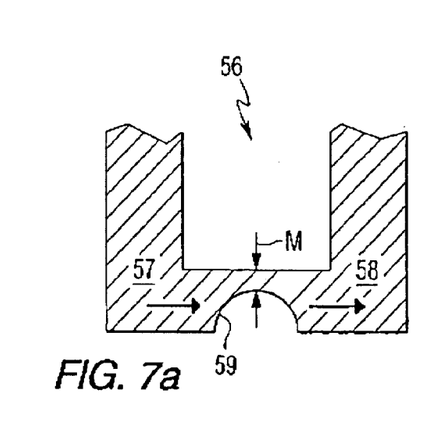
FIGS. 7a and 7b are partially schematic side and bottom views, respectively, of a longitudinal recording head having a non-uniform gap in the form of an ellipsoidal cavity in accordance with an embodiment of the present invention.
Figure 7B:
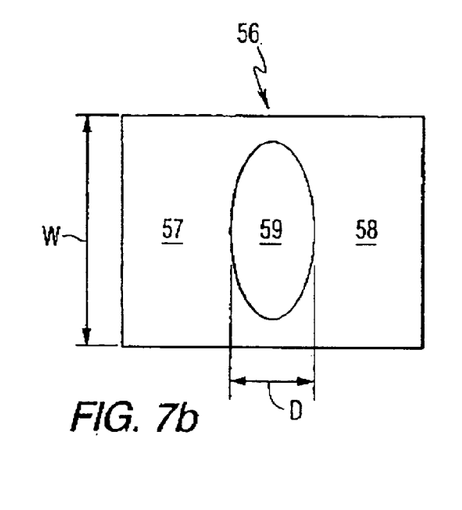

In accordance with an embodiment of the present invention, the magnetic field profile and strength are controlled by varying the gap region in the vertical direction, through the use of a generally ellipsoidal geometry, as shown in FIGS. 7a and 7b. The head 56 includes first and second poles 57 and 58 with an ellipsoidal cavity 59 therebetween. The ellipsoidal cavity 59 defines a minimum yoke distance M which corresponds to the location of maximum flux concentration below the gap 59.

Figure 8A:
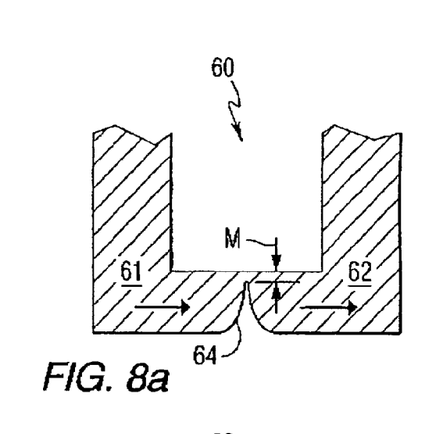
FIGS. 8a and 8b are partially schematic side and bottom views, respectively, of a longitudinal recording head having a non-uniform gap in the form of a partially ellipsoidal cavity having inwardly curved sidewalls in accordance with another embodiment of the present invention.
Figure 8B:
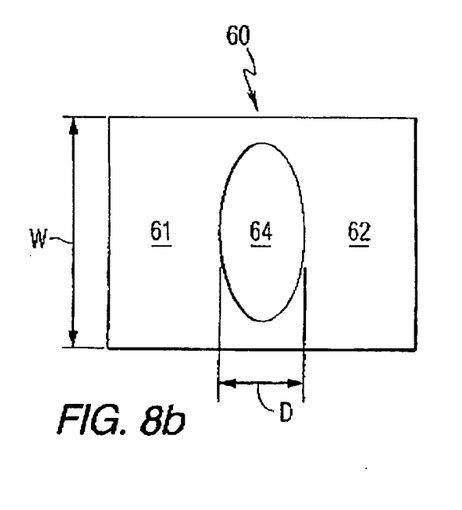

FIGS. 8a and 8b illustrate a head 60 in accordance with another embodiment of the present invention. First and second poles 61 and 62 have a contoured cavity 64 forming a non-uniform gap therebetween. The cavity 64 has an elliptical shape at the lower air bearing surface of the head 60, with inwardly curved sidewalls which form a narrow hollow tip defining a minimum yoke distance M. The minimum yoke distance M corresponds to the location of maximum flux concentration below the gap 64. The inwardly curved shape of the pole cavity shown in FIGS. 8a and 8b compensates for spacing losses. Another advantage of the inwardly curved walls in the generally ellipsoidal cavity as shown in FIGS. 8a and 8b is to increase the magnetic surface charge.

Because the gap length is negligibly small or zero, the present yoke structure can be saturated at a smaller coil current value than an equivalent conventional ring yoke. The smallest cross-sectional area of the yoke M saturates at a smaller current value than the rest of the yoke. A yoke geometry can be chosen such that the narrowest yoke cross-section M is located above the position of the pole cavity. As the current value is increased above the saturation point, the yoke region around the cavity starts to saturate. Before total saturation occurs this region is relatively soft and the magnetic field outside the yoke is perpendicular to the surface of the relatively soft pole material. As this region saturates, the magnetic charge density at the cavity surface reaches its maximum. The concave shape of the pole cavity effectively focuses the along-the-track field component in the media region. By adjusting the shape of the cavity, the fields can be concentrated in a small region of a recording medium.

The magnetic fields are determined by the surface charge density in the cavity of the pole. The larger the surface charge is, the larger the field is. In turn, the surface charge is proportional to the value of the discontinuity of the magnetization component normal to the surface. Hence, geometries such as that shown in FIGS. 8a and 8b will promote a larger magnetic charge at the cavity because the cavity surface on average is more normal to the flux propagation direction, thus increasing the magnetic charge.

Figure 9:
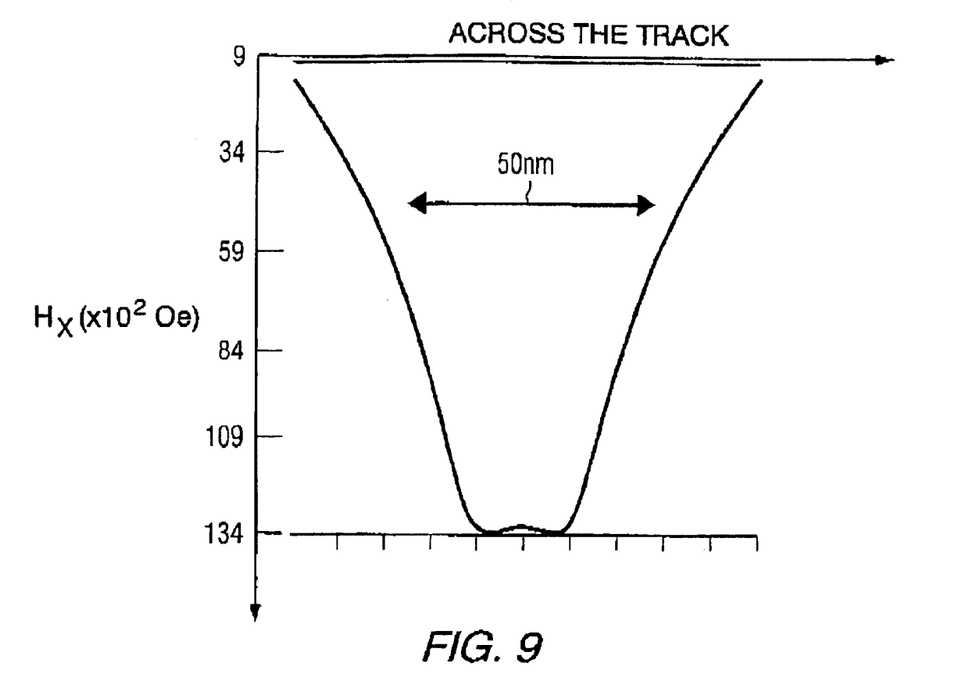
FIG. 9 is a graph of magnetic field strength across the track width for a longitudinal recording head having a non-uniform gap in accordance with an embodiment of the present invention.

A modeled along-the-track field component versus the distance across the track is shown in FIG. 9. The maximum field in a localized region of 60 nm×60 nm at a 10 nm flying height is approximately 13,4000e, corresponding to a storage density of more than 200 Gbit/in$^2$.

Although generally hemispherical or elliptical gap geometries are primarily described herein, several other non-uniform gap geometries may be used in longitudinal recording heads to improve their performance over conventional longitudinal recording heads. Alternative embodiments include gaps having curved or faceted cavities of various shapes. For example, the cavity may comprise a cylindrical hole having an axis perpendicular to the air bearing surface. Alternatively, the axis of the cylindrical hole may be parallel with the across-the-track direction of the head. The cross-sectional shapes of such cylindrical holes may be circular, ovular, elliptical, triangular, square, rectangular, hexagonal, octagonal, etc. The various non-uniform gap geometries of each opposing pole may be symmetrical or asymmetrical, e.g., one pole may have a curved cavity and the other pole may be flat or may have a cavity of different shape. Any gap cavity having contoured sides adapted to concentrate at least a portion of the magnetic flux will be advantageous as compared to conventional uniform gap longitudinal recording heads. This description and accompanying figures therefore provide only representative examples of the many possible gap geometries, not an inclusive list of all that will work.

Figure 10A:
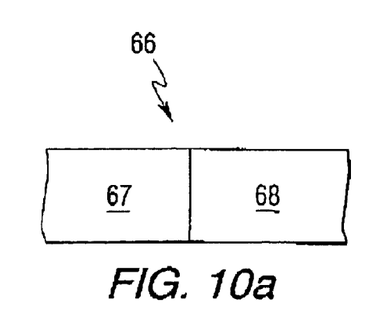
FIGS. 10a and 10b are partially schematic bottom views illustrating fabrication steps for producing a non-uniform gap in a longitudinal recording head in accordance with an embodiment of the present invention.
Figure 10B:
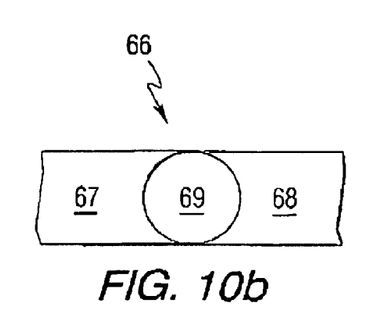

FIGS. 10a and 10b schematically illustrate fabrication steps for making a longitudinal recording head 66. First and second poles 67 and 68 are initially made by standard techniques to form adjacent sections, as illustrated in FIG. 10a. As shown in FIG. 10b, material is removed from portions of the first and second poles 67 and 68 to form a cavity 69. In order to make non-uniform gap longitudinal heads of the present invention, conventional processes for initially fabricating a longitudinal ring head can be used. The initial gap length defined in this process should preferably be close or equal to zero, as shown in FIG. 10a. As a second step, a circular hole, e.g., with a 50 nm diameter, can be defined using focused ion beam etching from the air bearing surface (ABS), as shown in FIG. 10b. Alternatively, the circular hole can be defined at the wafer level. Although a generally hemispherical cavity 69 is illustrated in FIG. 10b, any other suitable cavity shape may be used which sufficiently concentrates the magnetic flux generated by the head 66. Although the widths of the first and second poles 67 and 68 are shown as being equal in FIGS. 10a and 10b, the poles may alternatively have different widths.

Figure 11:
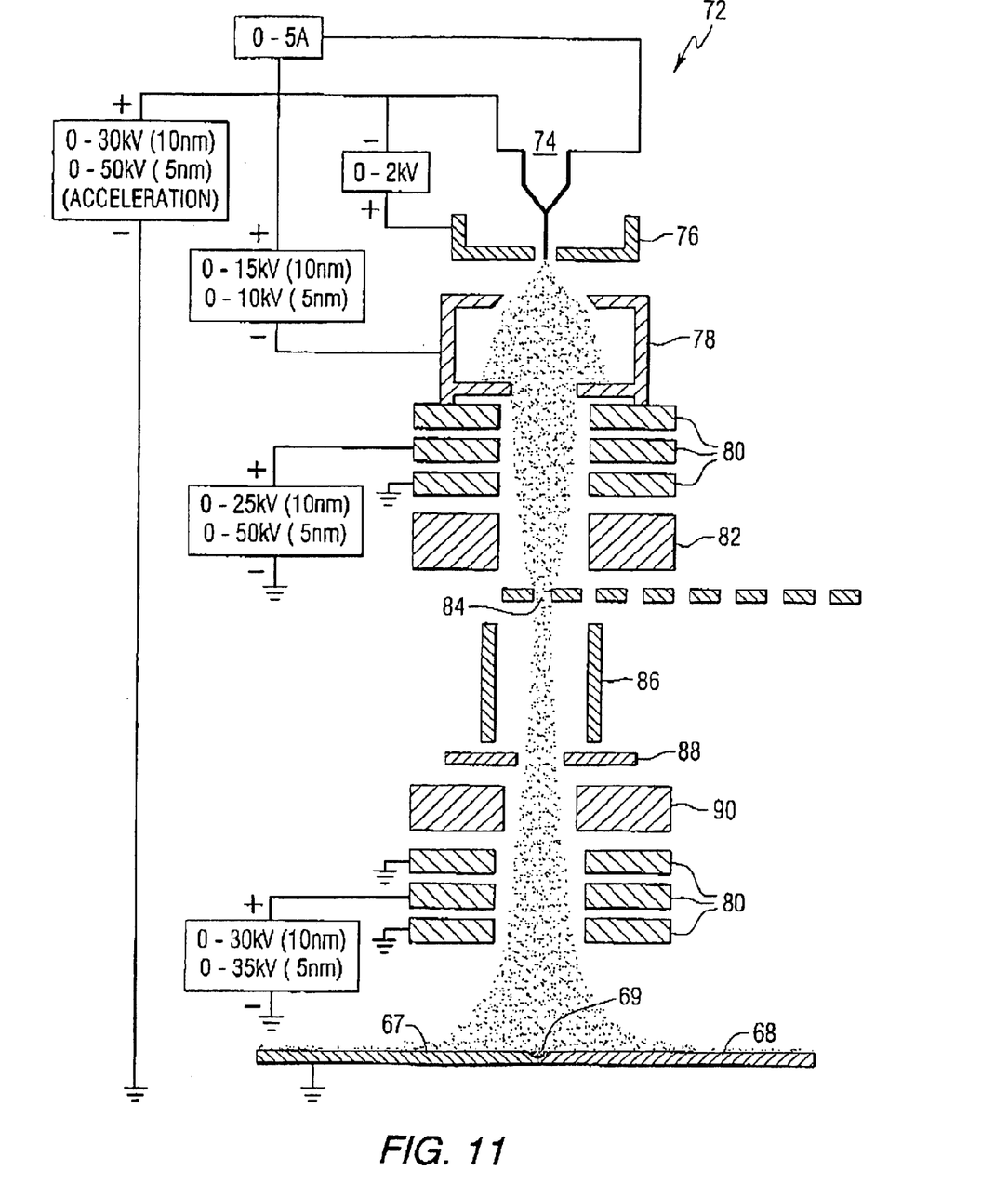
FIG. 11 is a partially schematic side sectional view of a focused ion beam direct etching apparatus used to produce a longitudinal recording head in accordance with an embodiment of the present invention.

Preferred methods of manufacturing a longitudinal head recording gap of the present invention include focused ion beam direct etching, electron lithography and optical lithography, with focused ion beam direct etching being most preferred. An example of a focused ion beam direct etching apparatus 72 is illustrated in FIG. 11. Positively charged ions of liquid metals, for example gallium, are focused onto the bottom surface of the first and second poles 67 and 68 to etch the cavity 69. During the process, ions are generated by an ion source 74, passing through a suppressor 76. The ions then proceed through an extractor and spray aperture 78, which begins the focusing process. Next, the ions pass through at least one lens 80, thereby continuing to focus the ions. A stigmator 82 is placed after the first group of lenses 80. The ions then pass through any one of a plurality of limiting apertures 84, which may be selected to further narrow the ion beam. After exiting the aperture 84, the ions pass through a blanking deflector 86, blanking aperture 88 and deflection assembly 90. Lastly, the ions pass through at least one additional lens 80 before striking the bottom surface of the first and second poles 67 and 68 to etch the cavity 69.

Figure 12:
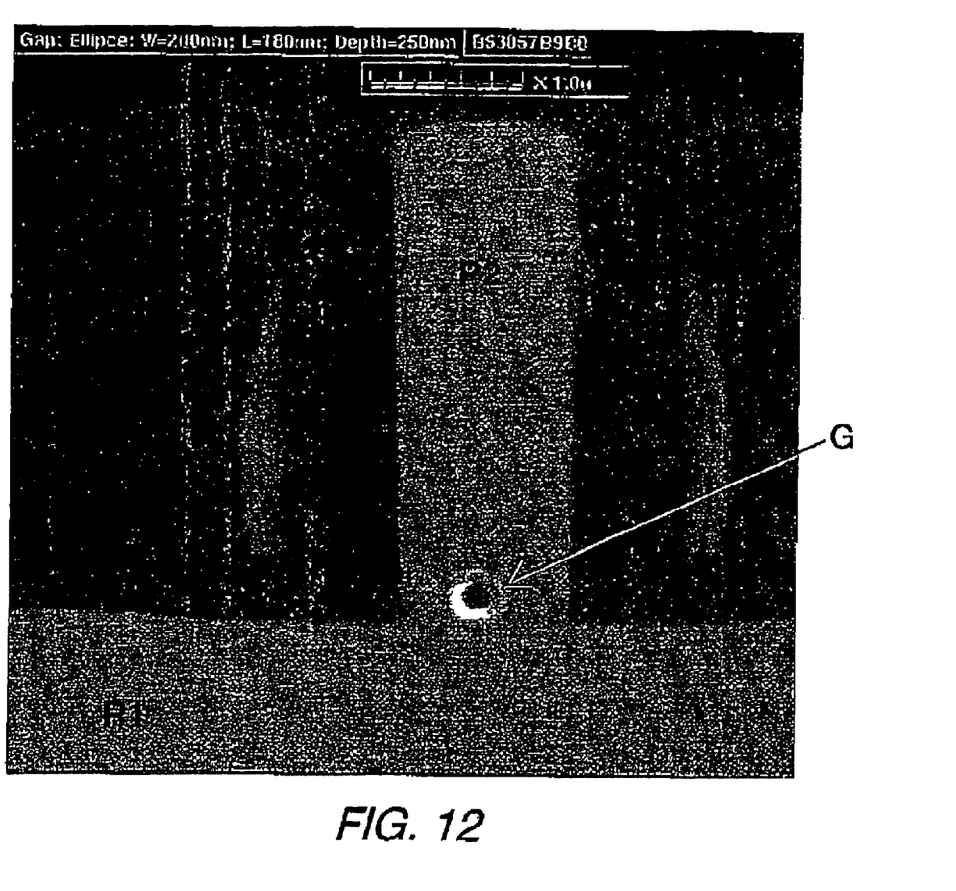
FIG. 12 is a photomicrograph of a longitudinal recording head including a non-uniform gap in the form of a cavity between the pole heads in accordance with an embodiment of the present invention.

FIG. 12 is a photomicrograph of the bottom or air bearing surface of a longitudinal recording head, showing a non-uniform concave gap (depicted by the arrow G) between first and second poles P1 and P2 of the recording head. The first pole P1 is the leading pole, and the second pole P2 is the trailing pole. The concave gap is generally ellipsoidal in shape with a length of 180 nm measured in the along-the-track horizontal direction in FIG. 12, a width of 200 mm measured in the across-the-track horizontal direction in FIG. 12, and a depth of 250 nm measured in a vertical direction perpendicular to the air bearing surface. When ellipsoidal gaps are used in accordance with the present invention, they typically have lengths of from about 50 to about 300 nm, widths of from about 50 to about 300 nm, and depths of from about 50 to about 500 nm.

Defining a non-uniform gap, e.g., a curved cavity, instead of the uniform gaps in conventional ring structures provides several advantages. The present invention extends the high density potential of conventional longitudinal write head designs by forming a non-uniform pole cavity, unlike the two-dimensional gap slits in conventional designs. The contoured gap region allows for more flexible control of the magnetic field strengths and profiles generated by the recording head. The non-uniform gap geometry allows the magnetic flux to concentrate in the gap region, thus causing relatively strong and localized fields in the disk region under the gap. This solves the problem of conventional ring heads in which the track width is limited by the gap length. Consequently, longitudinal recording heads incorporating the present non-uniform gaps can be used at densities well beyond 100 Gbit/in$^2$, while the maximum density achievable with conventional ring heads is approximately 30 Gbit/in$^2$. Another advantage of the present invention is that the longitudinal recording head does not require a major change of current fabrication processes or the introduction of new electronics.

Whereas particular embodiments of this invention have been described above for purposes of illustration, it will be evident to those skilled in the art that numerous variations of the details of the present invention may be made without departing from the invention as defined in the appended claims.

We claim:

1. A longitudinal recording head for use with a magnetic recording medium, the longitudinal recording head comprising:

first and second poles defining a non-uniform gap comprising a cavity, wherein portions of the first and second poles contact each other at an air bearing surface of the recording head and the non-uniform gap has a length that is not constant along a dimension across a track width of the recording head or along a dimension perpendicular to an air bearing surface of the recording head; and means for concentrating magnetic flux between the first and second poles in the vicinity of the gap to produce a localized magnetic field in the magnetic storage medium.

2. A longitudinal recording head according to claim 1, wherein the cavity is curved.

3. A longitudinal recording head according to claim 1, wherein the cavity is cylindrical.

4. A longitudinal recording head according to claim 1, wherein the cavity comprises a substantially ellipsoidal or hemispherical shape.

5. A longitudinal recording head according to claim 4, wherein the cavity comprises at least one inwardly curved wall.

6. A longitudinal recording head according to claim 1, wherein the cavity has a length of from about 50 to about 300 nm, a width of from about 50 to about 300 nm, and a depth of from about 50 to about 500 nm.

7. A longitudinal recording head according to claim 1, wherein the cavity comprises a volume from which material from the first pole and/or from the second pole has been removed.

8. A longitudinal recording head according to claim 1, wherein the cavity is hollow.

9. A longitudinal recording head for use with a magnetic recording medium, the longitudinal recording head comprising:

first and second poles; and a non-uniform gap defined by the first and second poles, wherein portions of the first and second poles contact each other adjacent an air bearing surface of the recording head and the non-uniform gap has a length that is not constant along a dimension across a track width of the recording head or along a dimension perpendicular to an air bearing surface of the recording head.

10. A longitudinal recording head according to claim 9, wherein the non-uniform gap comprises a hollow cavity.

11. A longitudinal recording head according to claim 10, wherein the cavity is curved.

12. A longitudinal recording head according to claim 10, wherein the cavity is cylindrical.

13. A longitudinal recording head according to claim 10, wherein the cavity comprises a substantially ellipsoidal or hemispherical shape.

14. A longitudinal recording head according to claim 13, wherein the cavity comprises at least one inwardly curved wall.

15. A longitudinal recording head according to claim 10, wherein the cavity has a length of from about 50 to about 300 nm, a width of from about 50 to about 300 nm, and a depth of from about 50 to about 500 nm.

16. A longitudinal recording head according to claim 9, wherein the non-uniform gap comprises a cavity having a volume from which material from the first pole and/or from the second pole has been removed.

17. A longitudinal recording head for use with a magnetic recording medium, the longitudinal recording head comprising:

first and second poles defining a non-uniform gap comprising a substantially cylindrical cavity; and means for concentrating magnetic flux between the first and second poles in the vicinity of the gap to produce a localized magnetic field in the magnetic storage medium.

18. A longitudinal recording head for use with a magnetic recording medium, the longitudinal recording head comprising:

first and second poles defining a non-uniform gap comprising a substantially ellipsoidal or hemispherical cavity; and means for concentrating magnetic flux between the first and second poles in the vicinity of the gap to produce a localized magnetic field in the magnetic storage medium.

19. A longitudinal recording head for use with a magnetic recording medium, the longitudinal recording head comprising:

first and second poles; and a non-uniform gap comprising a substantially cylindrical cavity defined by the first and second poles, wherein portions of the first and second poles contact each other adjacent an air bearing surface of the recording head.

20. A longitudinal recording head for use with a magnetic recording medium, the longitudinal recording head comprising:

first and second poles; and a non-uniform gap comprising a substantially ellipsoidal or hemispherical cavity defined by the first and second poles, wherein portions of the first and second poles contact each other adjacent an air bearing surface of the recording head.

* * * * *